Patented Mar. 1, 1932

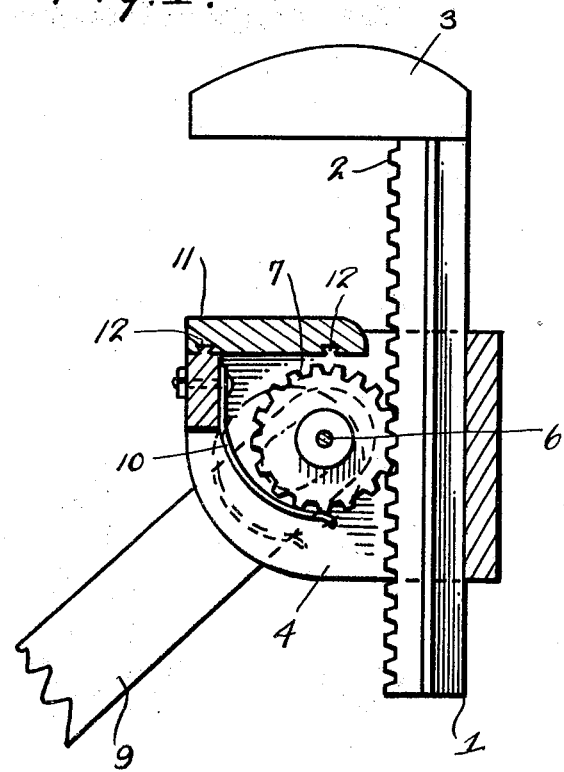
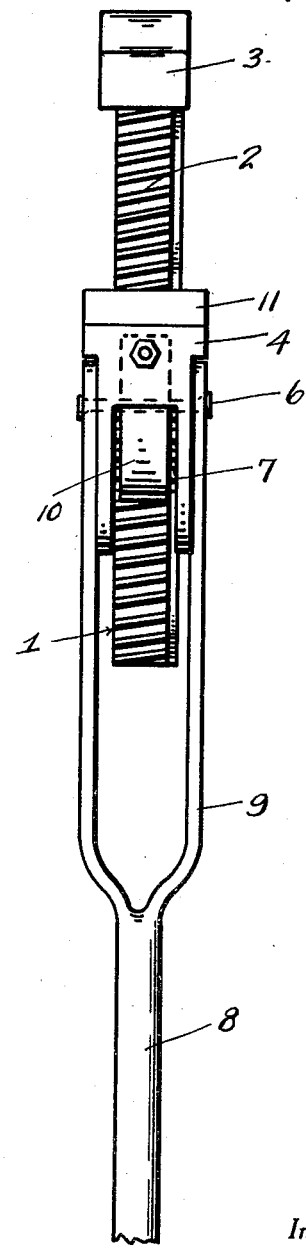
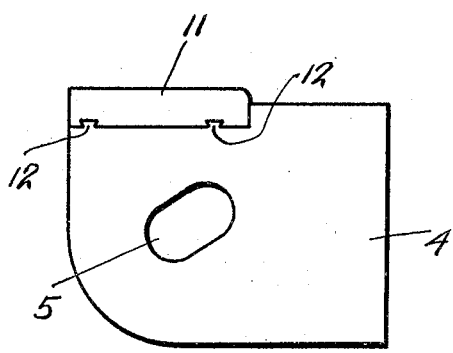

1,847,959

UNITED STATES PATENT OFFICE

JASON HARRIS, OF MOUNT AIRY, NORTH CAROLINA, ASSIGNOR, BY DIRECT AND MESNE ASSIGNMENTS, TO THE HARRIS WRENCH COMPANY, INC., OF MOUNT AIRY, NORTH CAROLINA, A CORPORATION OF NORTH CAROLINA

WRENCH

Application filed April 1, 1931. Serial No. 526,951.

This invention relates to a wrench, the general object of the invention being to provide a quickly and easily adjustable wrench.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is an elevation, with parts in section, of the improved wrench.

Figure 2 is an edge view looking toward the rack teeth of the shank.

Figure 3 is an elevation of the movable jaw.

In these drawings, the numeral 1 indicates the shank of the wrench which on its inner edge is formed with the rack teeth 2 and the numeral 3 indicates the stationary jaw connected to one end of the shank. The movable jaw is made in the form of a casing 4 which is slidably arranged on the shank and the sides of which are formed with diagonally arranged elongated openings 5 for receiving the ends of a shaft 6 which carries a pinion 7 which is located in the casing 4. A handle 8 has one end forked as shown at 9 and the ends of the prongs of this forked part are connected with the ends of the shaft 6 so that by rocking the handle the shaft will be rocked to impart a similar movement to the pinion and if the teeth of the pinion are in mesh with the rack teeth this movement will impart a movement to the casing 4 so that the same will be adjusted toward or away from the stationary jaw.

By pulling outwardly on the handle the shaft will be moved in the slot 5 so that the pinion will be moved out of mesh with the rack teeth which will permit the casing 4 to be rapidly moved on the shank. Thus the movable jaw can be easily and quickly moved against objects placed between the stationary jaw and removable jaw and then by moving the handle the pinion is placed in engagement with the rack teeth and partly rotating the handle the pinion will be rotated to move the casing firmly against the articles to grip the same between itself and the stationary jaw.

A spring 10 is arranged in the casing adjacent the pinion and acts to normally hold the same in mesh with the rack teeth.

A jaw member 11 is slidably and removably connected with the operative face of the casing by having dovetailed grooves therein engaging the dovetail guideways 12 on the casing so that this jaw member will engage an object placed between the casing and the stationary jaw and by having the jaw member removable it can be replaced by other types of jaw members such for instance as the jaw member having teeth thereon for engaging a rounded object such as a pipe wrench or in cases where a flat faced jaw might not properly hold an object placed between the jaws of the wrench.

It is thought from the foregoing description that the advantages and novel features of the invention will be readily apparent.

It is to be understood that changes may be made in the construction and in the combination and arrangement of the several parts provided that such changes fall within the scope of the appended claim.

The shank 1 is formed with the key 1' which engages a keyway in the housing.

Having thus described my invention, what I claim as new is:

A wrench of the class described comprising a shank having rack teeth on its inner edge, a stationary jaw extending at right angles from one end of the shank, a casing having oppositely arranged openings therein through which the shank passes, the sides of the casing having diagonally arranged slots therein, the high ends of which are located adjacent the shank, a shaft having its ends passing through the slots, a pinion rigidly mounted on the shaft and located within the casing, the teeth of said pinion engaging the teeth of the rack when the ends of the shaft are located in the high ends of the slots, a handle having a forked end, the prongs of which are rigidly connected to the ends of the shaft, a leaf spring having one end connected to the casing with its free part engaging the pinion for normally holding the pinion in engagement with the rack, and a jaw carried by the casing for co-operating with the stationary jaw for holding objects between itself and said stationary jaw.

In testimony whereof I affix my signature.

JASON HARRIS.